United States Patent [19]
Meeks

[11] Patent Number: 5,958,585
[45] Date of Patent: Sep. 28, 1999

[54] APPARATUS AND METHOD FOR DETERMINING THE DIRECTION OF AMBIENT AIRFLOW

[76] Inventor: Paul H. Meeks, 101 Traci Dr., Tallulah, La. 71282

[21] Appl. No.: 09/014,190

[22] Filed: Jan. 27, 1998

Related U.S. Application Data

[60] Provisional application No. 60/039,711, Feb. 11, 1997, abandoned.

[51] Int. Cl.⁶ ....................................................... B32B 9/00
[52] U.S. Cl. .......................... 428/392; 428/359; 428/364; 428/375; 428/394; 428/400; 428/401; 428/398
[58] Field of Search ............................. 19/200, 202, 105, 19/107, 57; 428/378, 359, 364, 375, 392, 394, 400, 401, 398

[56] References Cited

U.S. PATENT DOCUMENTS 5,295,283   3/1994   Gillum et al. ........................... 19/55 R

*Primary Examiner*—Merrick Dixon
*Attorney, Agent, or Firm*—Randall C. Brown; Rick Matos; Akin, Gump, Strauss, Hauer & Feld, L.L.P.

[57] ABSTRACT

An apparatus for determining the direction of ambient airflow and a method for the use thereof. The apparatus includes man-made or natural fibers that float when released into the air by a user. The direction of ambient airflow is determined by observing the direction of movement of the fibers from the point of release from the user's hand.

9 Claims, 1 Drawing Sheet

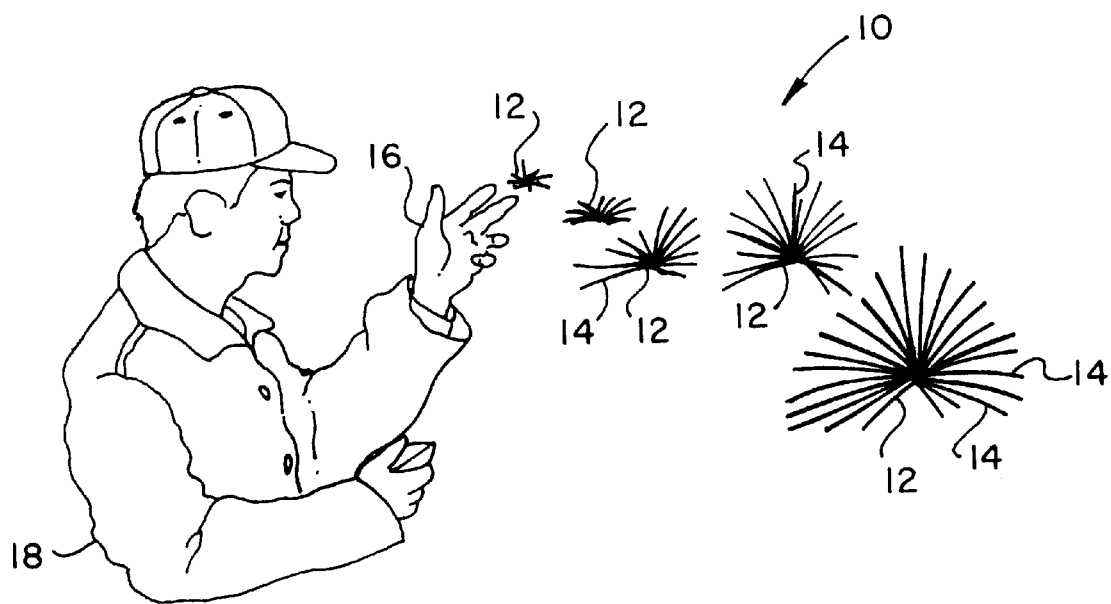

APPARATUS AND METHOD FOR DETERMINING THE DIRECTION OF AMBIENT AIRFLOW

CROSS-REFERENCE TO RELATED APPLICATION

This application claims the benefit of prior filed U.S. Provisional Application No. 60/039,711 filed Feb. 11, 1997, abandoned.

BACKGROUND OF THE INVENTION

1. Field of the Invention

The present invention relates to apparatus and a method for determining the direction of ambient airflow. More specifically, the present invention comprises man-made or natural fibers that are released into the ambient air by a user. The direction of ambient airflow is determined by observing the movement of the fibers from the point of release into the ambient air.

2. Description of Related Art

In various sporting and outdoor activities it is important to know the direction of ambient airflow. For instance, hunters need to know the direction of ambient airflow so as to be positioned downwind from the intended prey. This is very important when hunting so that the prey will not be alerted to the presence of the hunter by the hunter's scent. Archers and target shooters need to know the direction of ambient airflow so as to judge what effect the wind will have on the flight of an arrow and bullet, respectively. Golfers also need to know the direction of ambient airflow so as to judge what effect the wind will have on the flight of a golf ball. Field goal kickers and soccer players also need to know the direction of ambient airflow to gauge what effect the wind will have on the flight of a football or soccer ball.

One commonly used technique for determining the direction of ambient airflow is to wet one's index finger and hold it in the air to see which side of the finger dries first. According to this technique, the wind is determined to be blowing from the side of the finger that dries first. This is a very inexact and often inaccurate method for determining the direction of ambient airflow.

A common technique used by hunters is to tie a thread to a gun or a bow and observe the direction in which the thread is blown by the ambient air. This too is an inexact and inaccurate method for determining the direction of ambient airflow since the airflow immediately adjacent the hunter is often misleading compared to a larger area surrounding the hunter.

Another problem faced by hunters trying to mask their scent from the intended prey is that trees and terrain changes, including hills, low spots and creek beds, all have a tremendous effect on air current drafts.

Accordingly, other techniques used by hunters to determine the direction of ambient airflow include the release of a powder into the air or the use of a smoking device. These techniques are undesirable because one can see the powder only for a very short period of time before it disperses and effectively disappears and smoking devices necessarily release an undesirable scent along with the smoke.

Outside of the above-noted techniques there is no other way to track airflow visually. As discussed above, it is important that a hunter knows the direction the wind is coming from and where it goes once it passes by the hunter. The wind does not travel in straight lines, indeed, wind currents move upward and downward, swirl and change directions. Without knowledge of such wind patterns, the hunter is handicapped in treestand placement, in knowing how high to hunt, in timing shots and especially in predicting movement of prey such as deer. A need exists, therefore, for apparatus and a method that can be used to determine the direction of ambient airflow so that a hunter can place himself or herself in a given area for the best hunting advantage.

SUMMARY OF THE INVENTION

The ambient airflow indicator of the present invention overcomes the above-mentioned disadvantages and drawbacks which are characteristic of the related art. In a preferred embodiment of the present invention, the ambient airflow indicator comprises a man-made or natural fiber. The ambient airflow indicator is utilized by releasing a hand-full of the fibers into the air. The observed direction of movement of the fibers from the point of release indicates the direction of ambient airflow.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawing.

BRIEF DESCRIPTION OF THE DRAWING

The FIGURE is a perspective view of the ambient airflow indicator of the present invention.

DESCRIPTION OF THE PREFERRED EMBODIMENTS

Referring now to the drawing, a preferred embodiment of the ambient airflow indicator of the present invention is shown and generally designated by the reference numeral 10.

As shown in the FIGURE, the ambient airflow indicator 10 preferably includes a plurality of fibrous members 12. Each individual fibrous member 12, preferably, comprises a plurality of elongated stalks 14. The fibrous members 12 preferably have a very high surface area and a very low mass so that the fibrous members 12 have a high surface area to mass ratio and, preferably, are feather-light.

In this manner, upon release from the hand 16 of a user 18, the ambient airflow indicator 10 will appear to float in the air and will remain in the air for a long enough period of time for the user 18 to observe the direction of movement of the ambient airflow indicator 10. The direction of movement of the ambient airflow indicator 10 with respect to the point of release from the hand 16 of the user 18 indicates the direction of ambient airflow. The fibrous members 12 of the ambient airflow indicator 10 float along with wind currents—following every updraft or downdraft—accurately tracing the wind's path. By releasing two or three of the fibrous members 12 the user 18 can establish an invisible line of where the user 18's scent is being carried.

The fibrous members 12 used in the ambient airflow indicator 10 of the present invention may be made of any suitable man-made or natural material well known to those of ordinary skill in the art that has a high surface area to mass ratio.

According to a preferred embodiment of the present invention, the fibrous members 12 comprise milkweed fibers.

According to another preferred embodiment of the present invention, the fibrous members 12 are dyed for high visibility. Preferably, the fibrous members 12 are dyed white, orange, pink or fluorescent colors or any other color that will provide high visibility to the fibrous members 12.

According to yet another embodiment of the present invention, the fibrous members 12 are infused with a deer scent, a deer attractant or a scent to cover-up the scent of a human. The apparatus according to this embodiment is especially preferred for deer hunting applications. Those of ordinary skill in the art will recognize that the scent of other types of prey or attractants for other types of prey can be infused in the apparatus of the present invention for applications involving the hunting of such other types of prey.

In operation of the ambient airflow indicator 10 of the present invention, the user 18 selects a hand-full of the fibrous members 12 and releases the fibrous members 12 into the air. The direction of movement of the fibrous members 12 with respect to the point of release indicates the direction of ambient airflow. Once the ambient airflow direction is determined, a hunter can take a position that is downwind from the prey, an archer can adjust the aim of an arrow to compensate for the effect the wind will have on the flight of an arrow, a target shooter can adjust the aim of a gun to compensate for the effect the wind will have on the flight of a bullet, a golfer can adjust the swing of a golf club to compensate for the effect the wind will have on the flight of a golf ball, a field goal kicker or soccer player can adjust the direction of his or her kick to compensate for the effect the wind will have on the flight of a football or soccer ball and the participants in any other type of sporting activity can adjust their behavior to compensate for the effect the wind will have on their activity.

While preferred embodiments of the invention have been shown and described, it will be understood by persons of ordinary skill in the art that various changes and modifications may be made without departing from the spirit and scope of the invention which is defined by the following claims.

What is claimed is:

1. An airflow direction indicator comprising:
    a container which can be held by hand; and
    a plurality of loose fibrous members disposed within said container, said fibrous members comprising at least one of a dye and a scent applied to said fibrous members and having a high surface area to mass ratio, each of said fibrous members comprising a plurality of elongated stalks made of materials selected from the group consisting of natural and man-made fibers; wherein said fibrous members can float along and trace updrafts and downdrafts in ambient air for a period of time sufficient to indicate said direction of ambient airflow.

2. An airflow direction indicator according to claim 1, wherein said fibrous members comprise milkweed fibers.

3. An airflow direction indicator according to claim 1, where said dye is of a color selected from the group consisting of white, orange, pink, and fluorescent colors.

4. An airflow direction indicator according to claim 1, wherein said scent is selected from the group consisting of a scent of a prey, a scent of an attractant, and a scent that covers up the scent of a human.

5. An airflow direction indicator according to claim 4, wherein said scent is a deer scent.

6. A method for determining the direction of ambient airflow comprising the steps of:
    (a) selecting by hand a plurality of loose fibrous members from a container containing said loose fibrous members, said loose fibrous members being selected from the group consisting of natural and man-made fibers having a high surface area to mass ratio and said fibrous members comprising at least one of a scent and a dye applied to said fibrous members;
    (b) releasing by hand said plurality of fibrous members at a first position in ambient air such that said fibrous members can float and trace updrafts and downdrafts in said ambient air; and
    (c) observing movement of said plurality of fibrous members for a long enough period of time for said fibrous members to move from said first position to a second position in said ambient air;
    whereby said movement of said plurality of fibrous members from said first position to said second position indicates the direction of ambient airflow.

7. A method according to claim 6, wherein said dye is a color selected from the group consisting of white, orange, pink and fluorescent colors.

8. A method according to claim 6, wherein said scent is selected from the group consisting of a scent of a prey, a scent of an attractant, and a scent that covers up the scent of a human.

9. A method according to claim 6, wherein said fibrous members comprise milkweed fibers.

\* \* \* \* \*